(12) United States Patent
Omar (10) Patent No.: US 9,100,304 B2
(45) Date of Patent: *Aug. 4, 2015

(54) RESOURCE MANAGEMENT IN DYNAMIC NETWORK ENVIRONMENTS

(71) Applicant: Verizon Patent and Licensing Inc., Arlington, VA (US)

(72) Inventor: Hassan M. Omar, Mount Vernon, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,047

(22) Filed: Nov. 4, 2013

(65) Prior Publication Data

US 2014/0059186 A1 Feb. 27, 2014

Related U.S. Application Data

(63) Continuation of application No. 12/571,058, filed on Sep. 30, 2009, now Pat. No. 8,576,728.

(51) Int. Cl.
*H04L 12/24* (2006.01)
*H04L 12/851* (2013.01)
*H04L 12/911* (2013.01)
*H04L 29/06* (2006.01)
*H04L 12/26* (2006.01)

(52) U.S. Cl.
CPC ............ *H04L 41/0823* (2013.01); *H04L 43/10* (2013.01); *H04L 47/2483* (2013.01); *H04L 47/781* (2013.01); *H04L 47/822* (2013.01); *H04L 65/60* (2013.01); *H04L 43/0876* (2013.01)

(58) Field of Classification Search
CPC ............................ H04L 43/10; H04L 41/0823
See application file for complete search history.

(56) References Cited

U.S. PATENT DOCUMENTS

| | | | | |
|---|---|---|---|---|
| 4,845,736 A * | 7/1989 | Posner et al. | | 379/27.01 |
| 4,907,253 A * | 3/1990 | Watrous | | 379/16 |
| 5,982,851 A * | 11/1999 | Kennedy et al. | | 379/21 |
| 6,084,858 A * | 7/2000 | Matthews et al. | | 370/238 |
| 8,576,728 B2 * | 11/2013 | Omar | | 370/247 |
| 2005/0055618 A1 * | 3/2005 | Finteis et al. | | 714/742 |
| 2006/0098575 A1 * | 5/2006 | Lee | | 370/237 |
| 2008/0080540 A1 * | 4/2008 | Karacali-Akyamac et al. | | 370/409 |
| 2008/0192753 A1 * | 8/2008 | Li | | 370/395.21 |
| 2008/0237587 A1 * | 10/2008 | Nierle et al. | | 257/48 |

* cited by examiner

*Primary Examiner* — Jason Mattis (57) ABSTRACT

A system comprises a communications network configured to support transmission of a plurality of communications streams and a resource manager communicatively coupled to the communications network and configured to provision resources of the communications network to the plurality of communications streams. The system may further comprise a performance test manager communicatively coupled to said communications network and configured to identify a communication stream from said plurality of communications streams, identify a test network path for said identified communication stream that is substantially free of other network traffic, and perform a performance test over said test network path.

20 Claims, 6 Drawing Sheets

RESOURCE MANAGEMENT IN DYNAMIC NETWORK ENVIRONMENTS

CROSS REFERENCE TO RELATED APPLICATIONS

This application is a continuation of U.S. patent application Ser. No. 12/571,058, filed on Sep. 30, 2009, now U.S. Pat. No. 8,576,728, issued on Nov. 5, 2013, the contents of which are hereby incorporated by reference in its entirety.

BACKGROUND

Communications sessions may require a portion of finite network resources when transmitting streams of traffic over a communications network. To support the traffic streams, traditional request-based network resource management systems may rely on receiving explicit indications regarding network resources requested for the traffic. Such systems may require that details of the requested resources be made available in advance. However, not all applications and systems support explicit resource requests.

Additionally, even for environments that do support explicit resource requests, a resource request may over or underestimate the amount of resources actually required for the traffic stream. In addition, while for some streams the required resources may be predictable and consistent through the life of the stream, the amount of resources required for other streams may vary over time. Thus, even in environments that support explicit resource requests, it may not be optimal to use the requested resource allocations to support traffic generated by a communications session.

DETAILED DESCRIPTION

A communications system may support the transmission of many communications sessions. Each communications session may include multiple components traffic streams, including, but by no means limited to voice, video and data streams. The traffic components of a communications session may vary over the lifetime of the communications session. Likewise, metrics, including bandwidth and quality of service (QoS) needed to support the communications session, may vary throughout the lifetime of the communications session.

The communications system may determine resources to allocate to a traffic stream based in part on measurements taken of the stream. Because existing network conditions and traffic may affect the traffic measurements, a test network path may be provided to allow the stream under test to exercise its best possible performance. In other words, to generate accurate results actual stream traffic may be sent over the test network path substantially free of the influence of other network traffic. The test network path may be implemented using a stream routing approach where the stream under test is rerouted over a testing path, a stream classification approach where the stream under test is classified for separate treatment as test traffic, or some combination or subcombination of these approaches. Based on the stream performance over the test network path, the traffic of the stream under test may be characterized. Because some streams may attempt to use as much available bandwidth as possible, a cap to determine resource utilization or to the available resources on the test network path may be imposed in some exemplary approaches.

Based on the characterization of the stream traffic, in combination with information regarding network conditions and other network traffic, a resource manager may determine what network resources to allocate to the stream under test. In addition, periodic measurements may be made to update the resource allocations for one or more streams to account for changes in network conditions and/or stream traffic requirements.

Figure 1:
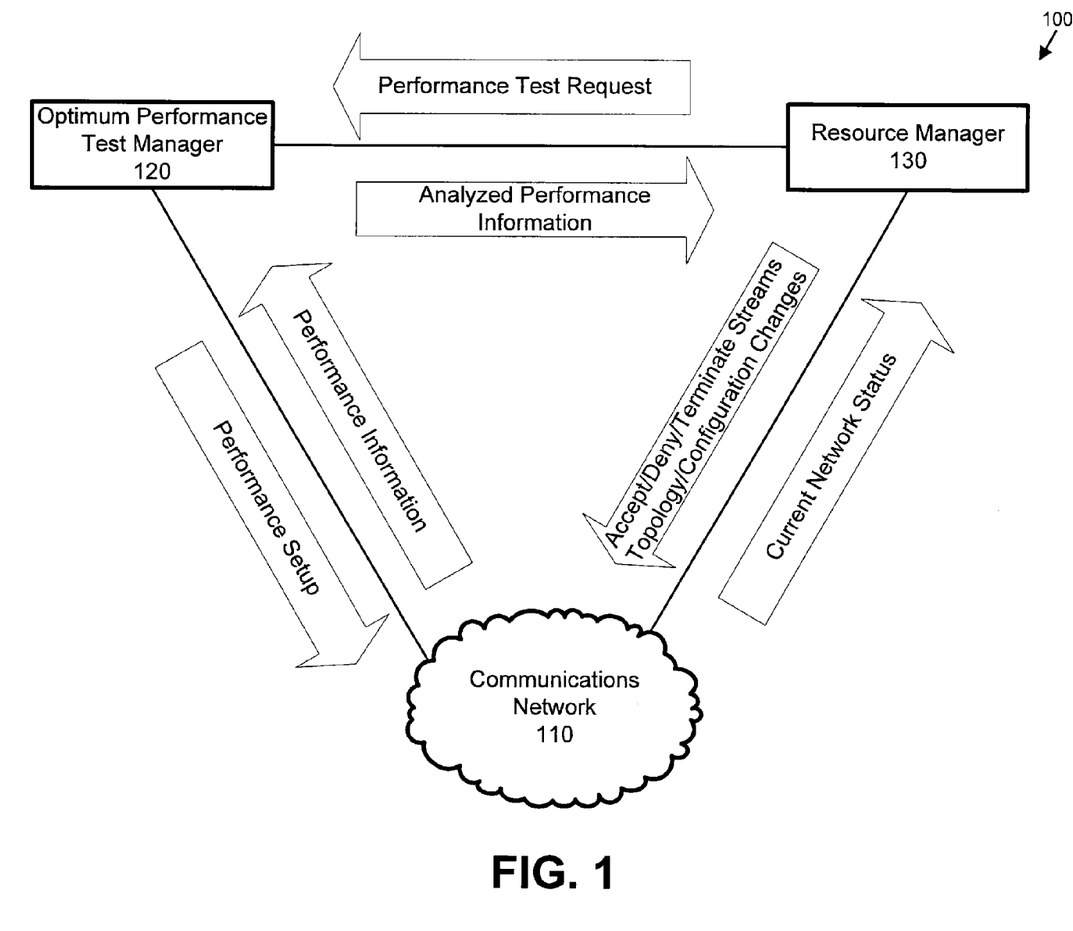
FIG. 1 illustrates an exemplary logical system diagram for resource management in a networking environment.

FIG. 1 illustrates an exemplary logical system 100 for resource management in a networking environment having a communications network 110, an optimum performance test manager (OPTM) 120 logical component, and a resource manager (RM) 130 logical component. Generally, the OPTM 120 logical component may be responsible for identifying performance metrics for a particular stream over communications network 110, while the RM 130 logical component may be responsible for allocating appropriate resources for streams on the communications network 110. Although an exemplary logical system 100 is shown in FIG. 1, the exemplary relationships illustrated in Figure are not intended to be limiting. Indeed, additional or alternative logical components and/or groupings of functionally may be used.

As illustrated in FIG. 1, system 100 includes a communications network 110. Communications network 110 may include a mixture of wired (e.g., fiber and copper) and wireless mechanisms that incorporate related infrastructure and accompanying network elements (e.g., switches, routers, gateways, hubs, service control points, service data points, service switching points, servers, databases, computing devices, transmitters, receivers, and wired lines). Illustrative communication networks include a Public Switched Telephone Network (PSTN), a Voice over Internet Protocol (VOIP) network, a cellular telephone network, and a Mobile-IP network. The communications network 110 may include multiple interconnected networks and/or sub-networks that provide communications services, including voice calling, packet-switched network services (including, for example, Internet access and/or VoIP communication services), as well as Short Message Service (SMS) messaging and Multimedia Messaging Service (MMS) messaging services, to at least one device (e.g., a subscriber device, a mobile device, cellular telephone, laptop computer, personal digital assistant, portable music player, etc.) connected to the communications network 110.

The OPTM 120 is a logical component that may be implemented by one or more network devices or elements comprising or connected to the communications network 110. The OPTM 120 may thus perform its component functions through use of the one or more underlying devices or elements though which it is implemented. Specifically, the OPTM 120 may perform the logical functions of identifying new unidentified communications steams traversing the communications network 110, identifying a controlled-performance test setup and test network path through which to run a controlled-performance test, setting up and performing the controlled-performance test, receiving performance test results, analyzing the performance test results, and forwarding analyzed test results to the RM 130.

The RM 130 is a logical component that may also be implemented by one or more network devices or elements connected to communications network 110. Accordingly, the RM 130 may also perform its component functions through use of the one or more underlying devices or elements. Generally, the RM 130 may perform the logical functions of receiving network status information relating to the communications network 110, determining the current network status of the communications network 110, requesting for a performance test to be performed by the OPTM 120 for a particular communications stream over the communications network 110, receiving analyzed performance test information, accepting, denying, or terminating communications streams for passage over the communications network 110, handling network topology and configuration changes of the communications network 110 in relation to resource allocations for communications streams, and allocating the appropriate resources of the communications network 110 to the communications stream to achieve optimal performance balance between user experience and network utilization, while also ensuring maximum network utilization.

Accordingly, through use of exemplary logical system 100, resource management may be performed in a dynamic network environment. As an example, the OPTM 120 may identify a new communications stream traversing the communications network 110, and inform the RM 130. In response, the RM 130 may request for a controlled-performance test to be performed by the OPTM 120. The OPTM 120 may determine a test network path, execute the controlled-performance test over the test network path, receive performance information, and return an analysis of the information to the RM 130. Based on the received analysis and other information relating to the communications network 110, the RM 130 may allocate resources to the communications stream.

The functions performed by the OPTM 120 and RM 130 may be implemented on one or more additional devices added and in communication with communications network 110. Alternately, the functions performed by the OPTM 120 and RM 130 may be implemented in whole or in part on existing network elements, including but not limited to those network elements supporting functions including routing, forwarding, mobility, policy, and resource management. Accordingly, existing network elements (such as switches, routers, gateways, hubs, databases, etc.) may be used to allow for integration of the OPTM 120 and RM 130 logical functions into an existing communications network 110. In still other examples, the logical functions of the OPTM 120 and RM 130 may be implemented in whole or part as software modules executed by one or more computing devices in selective communication with the communications network 110 (e.g., as standalone OPTM 120 and/or RM 130 network devices).

By way of example, a network gateway may perform some or all of the functions of the OPTM 120. In fact, while other implementations are possible and contemplated, a network gateway device may be particularly suited for at least a subset of OPTM 120 functionality, such as identifying new steams, because substantially all network traffic traveling from one network or sub-network to another may be required to pass through a gateway. Exemplary implementations of the logical functions of the OPTM 120 and RM 130 components will now be explained in detail with reference to FIGS. 2-5.

Figure 2:
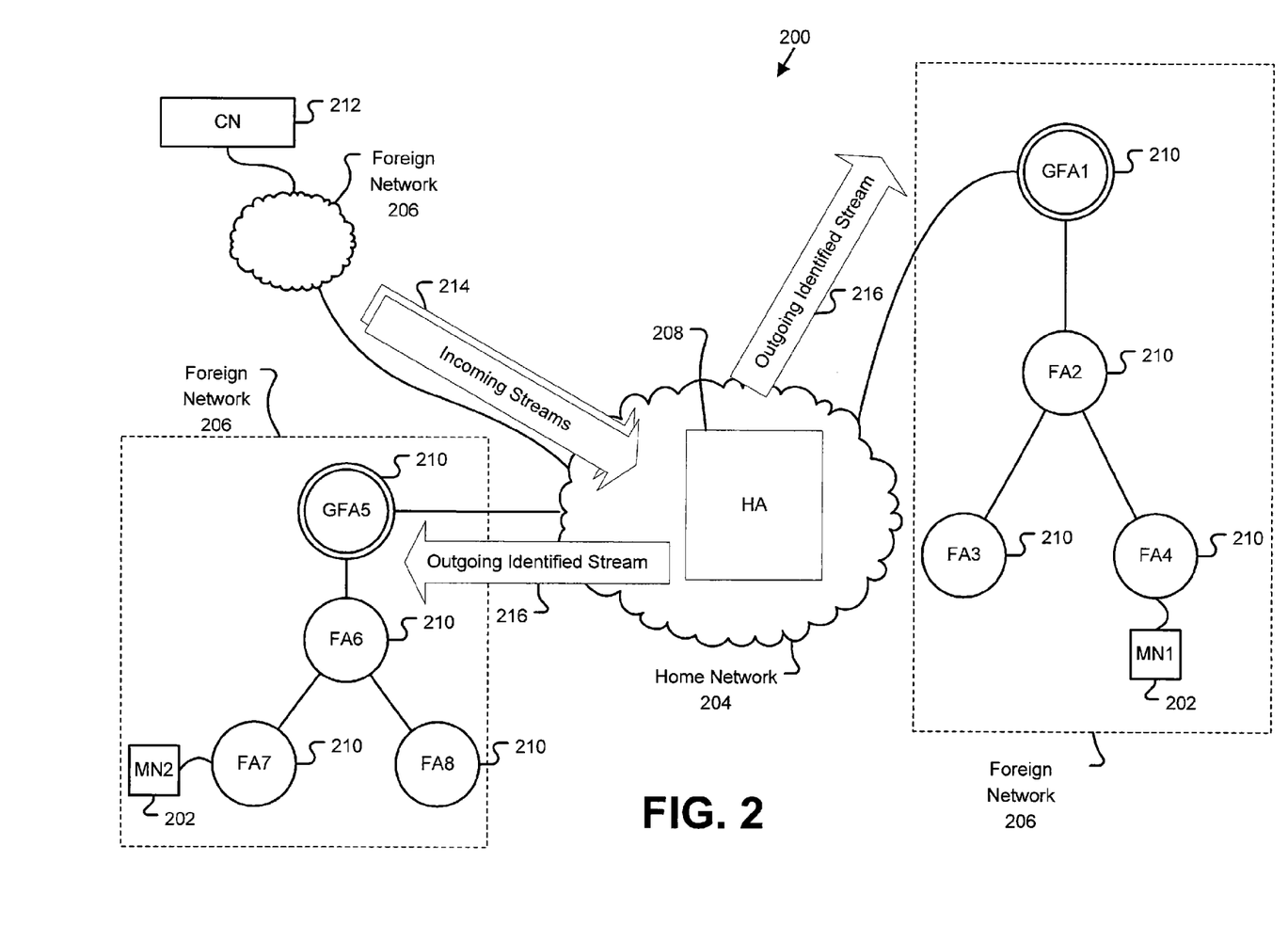
FIG. 2 illustrates an exemplary system for stream identification by a home agent.

FIG. 2 illustrates an exemplary system 200 for stream identification by a home agent 208. Generally, communications streams are identified so that the resource requirements of the streams may be measured. As illustrated in FIG. 2, a Mobile-IP environment represents an exemplary implementation and also to demonstrate operational aspects of the OPTM 120 and RM 130. However, while the concepts described herein are described in terms of Mobile-IP networks, the concepts are equally applicable to other networking environments and should not be considered to be limited to or otherwise directed solely to Mobile-IP networks or systems.

Mobile IP is an Internet Engineering Task Force (IETF) standard communications protocol that is described in detail in IETF RFC 3344, the contents of which are hereby incorporated herein by reference in its entirety. Generally speaking, in Internet Protocol (IP) networking, routing may be based on IP addresses associated with fixed locations, similar to how a postal letter is delivered to a fixed address indicated on an envelope. Through use of an IP address, a device on a network may be reachable through IP routing to the address assigned to the device. However, when a device moves from its fixed location on the network, the device may no longer be reachable using normal IP routing. Mobile-IP is a protocol designed to allow such mobile network devices, referred to as mobile nodes (MN) 202, to move from one network location to another while maintaining a relatively permanent identifier, such as an IP address with which the particular MNs 202 may be identified.

In a Mobile-IP network, a home network 204 of a MN 202 is the network within which the MN 202 receives its identifying IP address, the identifying address being referred to as a home address. The home address may be a relatively permanent IP address within the home network 204 assigned to the MN 202. Likewise, a foreign network 206 is a network in which a MN 202 operates when the MN 202 is away from its home network 204 (i.e., roaming). A home agent (HA) 208 may be a router type device or other network device on the home network 204 of the MN 202, and may be configured to tunnel datagrams (e.g., communications stream traffic) from the home network 204 for delivery to the MN 202 when the MN 202 is roaming on a foreign network 206. In other words, when the MN 202 is roaming, the HA 208 may used to reach the MN 202 through use of the home address of the MN 202.

To accomplish the communication flow, the HA 208 may be configured to maintain current location information for the MN 202 in association with information received from one or more foreign agents (FA) 210. A FA 210 may be a router type device or other network device that stores information about MN 202 visiting its network, i.e., a foreign network 206. The FA 210 to which a MN 202 is connected may advertise a care-of-address of the MN 202, where a care-of-address may be a physical IP address of the MN 202 when operating in the foreign network 206. The HA 208 may then receive the care-of address from the FA 210 and may associate the care-of-address with the home address of the MN 202. The association of the home address with the care-of-address may be referred to as a binding.

One or more FAs 210 may further function as a gateway, or entrance point, to the foreign network 206, and may be configured to interface with, transfer, accept and relay datagrams to one or more networks connected to the foreign network 206. These may be referred to as gateway foreign agents (GFA) 210. The home network 204 may be in selective communication with one or more foreign networks 206, through connections to GFAs 210 of the foreign networks 206. The GFA 210 may further be configured to convert between one or more protocols, such that the GFA 210 may accept a datagram formatted for a particular network, and convert the datagram to another protocol before forwarding the datagram on.

Maintaining a relatively permanent identifier (i.e., home address) allows the MN 202 to move between different networks (e.g., home network 204, foreign networks 206, etc.) without the need to tear down established transport layer sessions. As an example, this mobility allows a MN 202 to maintain a web connection to a web server or other internet connection when moving from one portion of a communications network 110 to another. As another example, the mobility allows the MN 202 to be accessible through use of a relatively permanent IP address, regardless of the present location of the MN 202 on the overall communications network 110.

A correspondent node (CN) 212 may be defined as a node that communicates or corresponds with a MN 202. An incoming communications stream 214 may be defined as the traffic flow sent from a CN 212 intended to be communicated to the MN 202.

As indicated above, one of the logical functions of the OPTM 120 may be to identify communications steams 214 that are traversing the communications network 110. As illustrated in the Mobile-IP environment of FIG. 2, the HA 208 may be configured to perform the stream identification logical function of the OPTM 120 in the exemplary Mobile-IP network. As shown, CN 212 is in selective communication with MN1 202 and MN2 202, wherein the MNs 202 are each based in home network 204, but are roaming in different foreign networks 206. The HA 208 of the home network 204 may receive a plurality of incoming streams 214 from the CN 212. The HA 208 may perform stream identification on the incoming streams 214 according to the received traffic data to determine identified streams 216, and may forward the outgoing identified streams 216 to the MNs 202 through appropriate FAs 210.

More specifically, the HA 208 may be located at a gateway point of the home network 204, and may monitor traffic components including a plurality of different incoming communications streams 214 that may pass through. Based on the details of the traffic of the communications streams 214, the HA 208 may identify and track the various streams 214. Merely by way of example, the HA 208 may use one or more of source IP address, destination IP address, source port and destination port values (or any other fields located in the IP and transport layer headers of the incoming traffic) of the monitored traffic for tracking purposes and to identify particular incoming communications streams 214 on the network. For example, this functionality may be implemented by simple inspection of received frames (i.e., units of transmission in a link layer protocol consisting of a link-layer header followed by a packet). In other examples, more elaborate schemes to identify the particular incoming communications streams 214 may be supported, including considering other aspects of the traffic using technologies such as deep packet inspection (DPI).

When the HA 208 identifies a new incoming communications stream 214, the HA 208 may associate the incoming communications stream 214 with a client owner of the stream. For example, the client owner of the stream may be determined based on the source IP address or destination IP address of the communications stream 214 being associated with a MN 202 of the client owner. Ownership of the stream may be used to determine QoS privileges associated with the client owner. Ownership of the stream may also be used for verification of permission to use the network resources.

Once a client owner is determined, the HA 208 may associate the stream with an appropriate corresponding QoS class based on the determined QoS privileges of the client owner. For example, a client owner may be subscribed to a high level of service, and communications streams 214 for that client owner may likewise be associated with a correspondingly high QoS class. As another example, a second client owner may be more concerned with overall cost, and may subscribe to a low-cost service with a lower QoS. Communications streams 214 determined to be associated with the second client owner may be given a lower QoS class.

Accordingly, through a process such as the exemplary one illustrated, the HA 208 may identify new incoming communications streams 214. Once identified, the communications streams may be referred to as identified streams 216. A table or other structure of identified streams 216 may be maintained by the HA 208 or a data store in selective communication with the HA 208 (not shown in FIG. 2). This table or structure may store characteristic information relating to the stream (e.g., source IP address, destination IP address, source port and destination port values, etc.) and may be used to determine whether an incoming communications stream 214 corresponds to an identified stream 216 or to an unknown incoming stream 214. When a new stream 214 is identified, the HA 208 may add a record relating to the identified stream 216 into the table or structure of characteristic information.

Although the HA 208 may perform at least a portion of OPTM 120 stream identification functionality, in situations where there is preference to dedicate the HA 208 for functions strictly related to mobility management (such as maintaining home address and care-of address bindings for MNs 202), the stream identification logical function of the OPTM 120 may be implemented on a different network element of the system separate from the HA 208.

Figure 3:
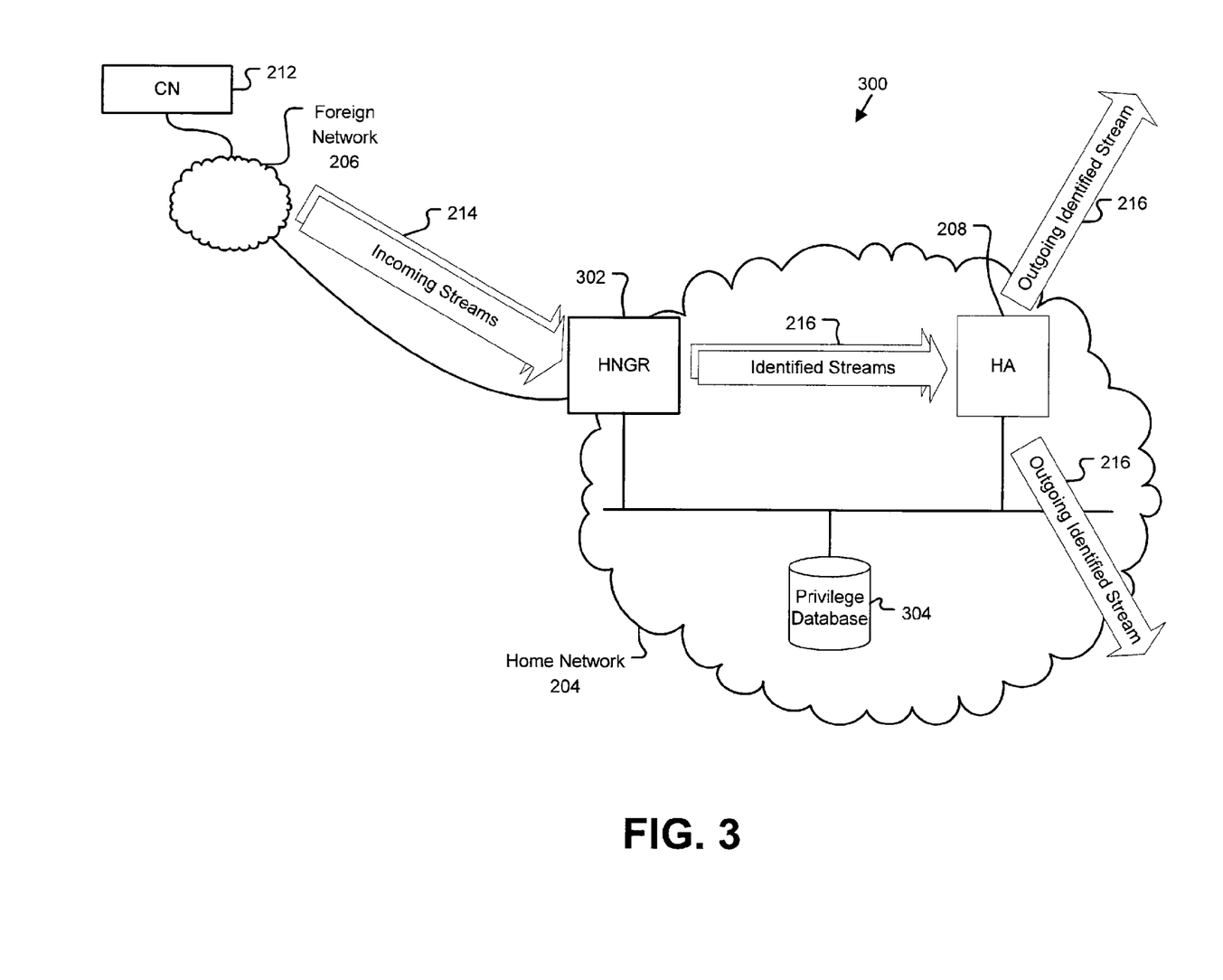
FIG. 3 illustrates an exemplary system for stream identification by a home network gateway router.

FIG. 3 illustrates an alternate exemplary implementation of a system 300 in which stream identification is performed by a home network gateway router (HNGR) 302, rather than by a HA 208.

A HNGR 302 may be a network node or device that functions as an entrance point to the home network 204, and may be configured to interface with, transfer, accept and relay datagrams to one or more networks connected to the home network 204, such as foreign network 206. The HNGR 302 may further be configured to convert between one or more protocols, such that the HNGR 302 may accept a datagram formatted for a particular network, and convert the datagram to another protocol before forwarding the datagram on. In some examples, HNGR 302 may be implemented in hardware, or in hardware in combination with software such as software installed within a router device.

As illustrated in FIG. 3, incoming streams 214 may be directed from a CN 212 to the HNGR 302 of home network 204. Similar to as discussed above with regard to HA 208, the HNGR 302 may be configured to identify the incoming communications streams 214. Also similar to as discussed above, the HNGR 302 may determine a client owner of the stream 214, and may associate QoS class information with the identified stream 216. In some examples, QoS privilege associations may be stored by the HNGR 302. In other examples, QoS privilege associations may be stored in a separate device from HA 208 and/or from HNGR 302, such as a privilege database 304. Once the streams are identified, the HNGR 302 may forward the identified communications streams 216 to the HA 208 for the home network 204.

Accordingly, stream identification logical functions of the OPTM 120 may be implemented on various network elements such as the HA 208, the HNGR 302, the privilege database 304, or one or more other elements associated with a home network 204.

Figure 4:
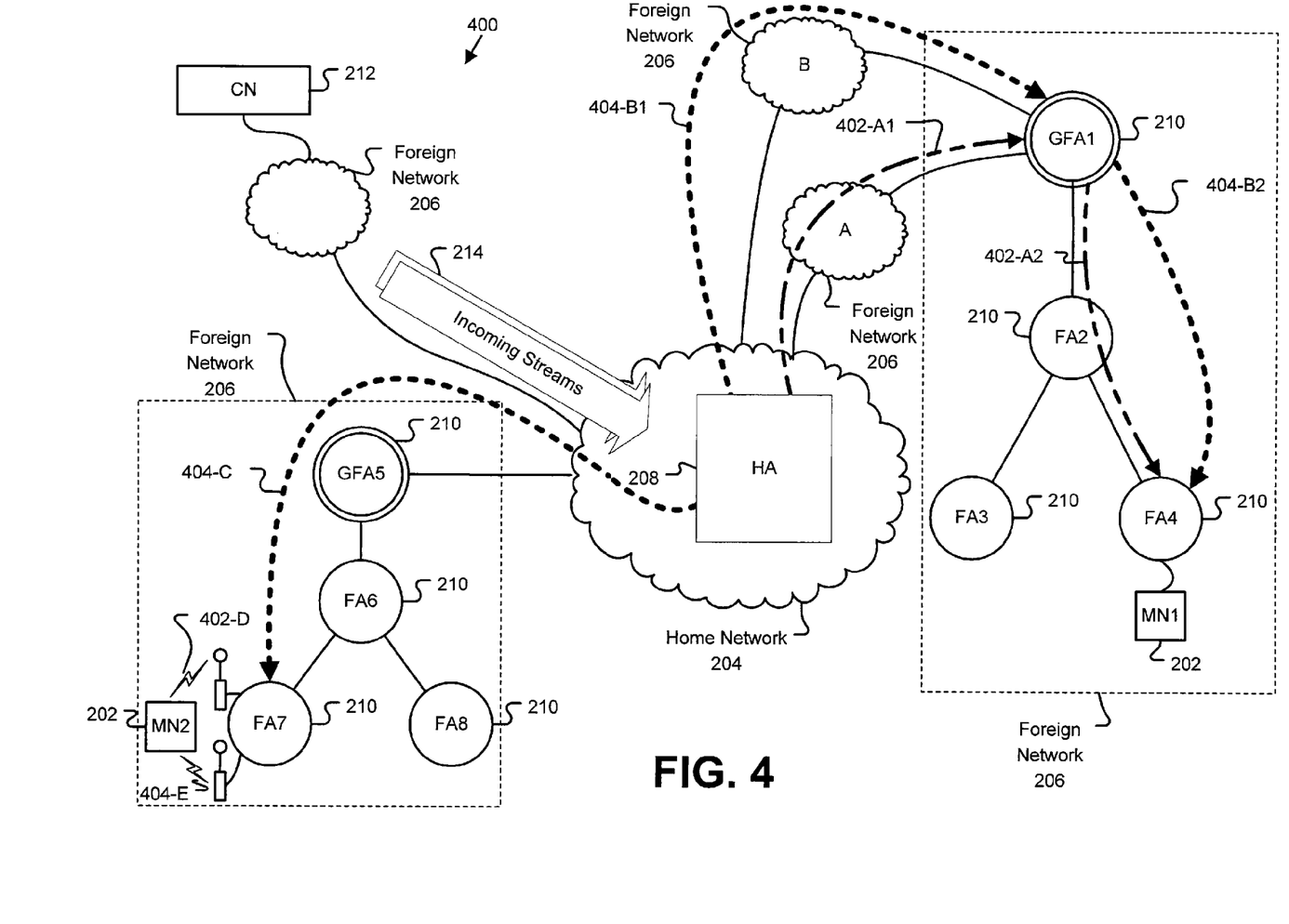
FIG. 4 illustrates an exemplary system for a stream routing approach to determining optimum stream performance.

FIG. 4 illustrates an exemplary stream routing approach to implement a performance test, wherein the traffic associated with an identified stream 216 under test is forwarded to the destination over a performance-controlled path. Generally, a performance-controlled path is a path over a communications network 110 on which essentially no other network traffic is traveling. Through use of the performance-controlled path, a performance test may be implemented under which traffic from the stream 216 under test may flow and be measured without influence of network congestion or other network issues.

As illustrated in FIG. 4, a plurality of incoming streams 214 may be directed from CN 212, with one incoming stream 214 being directed towards MN1 202 and another incoming stream 214 being directed towards MN2 202. Upon identification of the communications streams 216, the OPTM 120 logical component may then identify normal network paths 402 on which the streams will be forwarded over the communications network 110. The OPTM 120 and RM 130 may also identify test network paths 404 in the form of performance-controlled paths over which stream traffic may be sent to characterize the communications streams 216. In some examples, the HA 208 may perform path identification; however, in other examples one or more other network elements instead of or in addition to HA 208 may perform the path identification, such as a HNGR 302.

As discussed above, HA 208 may use one or more fields located in the IP and transport layer headers of the incoming traffic for tracking purposes and to identify particular incoming communications streams 214 on the network. Additionally, HA 208 may use header information such as the destination IP address of the steam traffic to identify a receiving point to which the stream traffic is intended. If the destination IP address references a stationary host, then the packet may be forwarded to the destination using standard IP routing techniques. However, when the destination is a mobile user (e.g., a MN 202), the destination IP address of the stream traffic may be that of a home network address for the MN 202. HA 208 may then determine the corresponding FA 210 care-of-address where the MN 202 host is currently roaming using the home address bindings discussed above.

Based on the address of the MN 202, the HA 208 may identify a normal network path 402 from the home network 204 to the MN 202. Specifically, the HA 208 may access a routing table of the communications network 110, including information about which network devices are connected to which other network devices, and information relating to the paths between the network devices. Using the routing table information, the HA 208 may determine a least-cost path from itself to any other node in the communications network 110, such as using a shortest path heuristic. Accordingly, through use of the routing table information, the HA 208 may determine a normal network path 402 from the home network 204 to the MN 202. In some instances, the routing information relating to the identified network path 402 may be maintained locally on the HA 208, while in other instances the routing information relating to the identified path 402 may be stored and retrieved from a separate resource management system (not shown).

With reference to the communications stream directed towards MN1 202, the HA 208 may identify the incoming stream 214 as being so directed, and further may determine the normal network path 402 to be traversed by the now-identified stream 216. This normal network path 402 may be determined by the HA 208, for example, through use of routing table information available from a HNGR 302 or stored by the HA 208. Specifically, the HA 208 may identify that the traffic of incoming stream 214 is to be forwarded over normal network path 402-A1 to reach GFA1 (the Gateway FA for the domain where MN1 202 is currently residing). From GFA1, HA 208 may further determine that the path GFA1 to FA2, and FA2 to FA4 is followed to reach MN1 202, as indicated in the figure as normal network path 402-A2. The links associated with the identified network path from HA 208 to MN1 202 are represented in the figure by thick dotted and dashed lines.

Once the normal network path 402 for the traffic of the communication stream has been identified, the OPTM 120 logical component (e.g., as implemented by one or more of HA 208, HNGR 302, etc.) in combination with the RM 130 may then determine an appropriate test network path 404 onto which to determine the network performance of the identified communications stream 216.

The RM 130 may have knowledge of the current state of the communications network 110, such as which link capacities for communications links as well as the capacity utilization of the communications links. Accordingly, RM 130 may determine what approach to use for construction of a test network path 404. This determination may be based in part on factors including current communications network 110 topology, and available network capacity such as whether a link is currently being fully utilized or is available to handle test network path 404 traffic. As an example, if a particular link has on average 3 megabits/sec of link capacity free, the RM 130 may infer that the link substantially always has such a quantity of link capacity free. Therefore the RM 130 may determine to use that excess capacity to run the controlled-performance test, rather than, for example, using a test network path 404 over a separate performance-controlled path.

In any event, when setting-up the performance test in accordance with any requirements determined by the RM 130, the HA 208 may identify an appropriate test network path 404 to carry the stream traffic. In some instances, a test network path 404 may be implemented over separate communications links that are specifically allocated for use in performance-controlled tests. For example, for the HA-GFA1 segment of the path, foreign network 206 B may be allocated for use in performance-controlled tests. Accordingly test network path 404-B1 through foreign network 206 B may be selected as a portion of the test network path 404. Additionally, a direct link between GFA1 and FA4 may be allocated for controlled-performance tests. Therefore, the direct link between GFA1 and FA4, illustrated as test network path 404-B2, may be allocated to complete the test network path 404 from HA 208 to MN1 202. The links associated with the complete test network path 404 from HA 208 to MN1 202 are represented in the figure by the thick dotted lines.

The links used to implement the test network path 404 (i.e., in this example Path B) are illustrated as being physically dedicated links. However in other example, logical links or links comprising the normal network path 402 (i.e., Path A) may be utilized as a part or whole of the test network path 404, as long as the performance metrics may be controlled and the links are substantially free of performance limitations (i.e., appropriate resources may be dedicated on the normal network path 402 for controlled-performance test traffic).

With reference to the communications stream directed towards MN2 202, a test network path 404 partially over a normal network path 402 is shown. Specifically, the RM 130 and/or HA 208 may identify the normal network path 402 GFA5, FA6, and FA7 as being an appropriate test network path 404 on which to run a controlled-performance test (in this example test network path 404-C). For example, due to there being sufficient network resources along the path from GFA5 to FA6 to FA7, the RM 130 may inform the HA 208 that there is no need to identify a separate dedicated performance-controlled path for these illustrated segments of the network. On the other hand, the RM 130 or HA 208 may further identify that the normal network path 402-D may not be appropriate to run the controlled-performance test due to a bandwidth limitation of path 402-D. Accordingly, a test network path 404 over a different path may be identified by HA 208 over which to run the performance test, illustrated in the figure as test network path 404-E.

In addition to different types of test network path 404, different technologies can be used to create the links of the test network path 404. Merely by way of example, links may be created by, but by no means limited to Asynchronous Transfer Mode (ATM) and Multi Protocol Label Switching (MPLS) technologies, among others.

It should be noted that in the above description and diagrams, the shown paths are unidirectional from the CN 212 to the MNs 202. Similar concepts and approaches may accordingly be applicable to traffic flowing over the communications network 110 in the opposite direction.

By way of the system elements described above, the OPTM 120 logical component (e.g., as implemented by one or more of HA 208, HNGR 302, etc.) may be used to create a test network path 404 on which essentially no other network traffic is traveling for use in performing a controlled-performance test.

Figure 5:
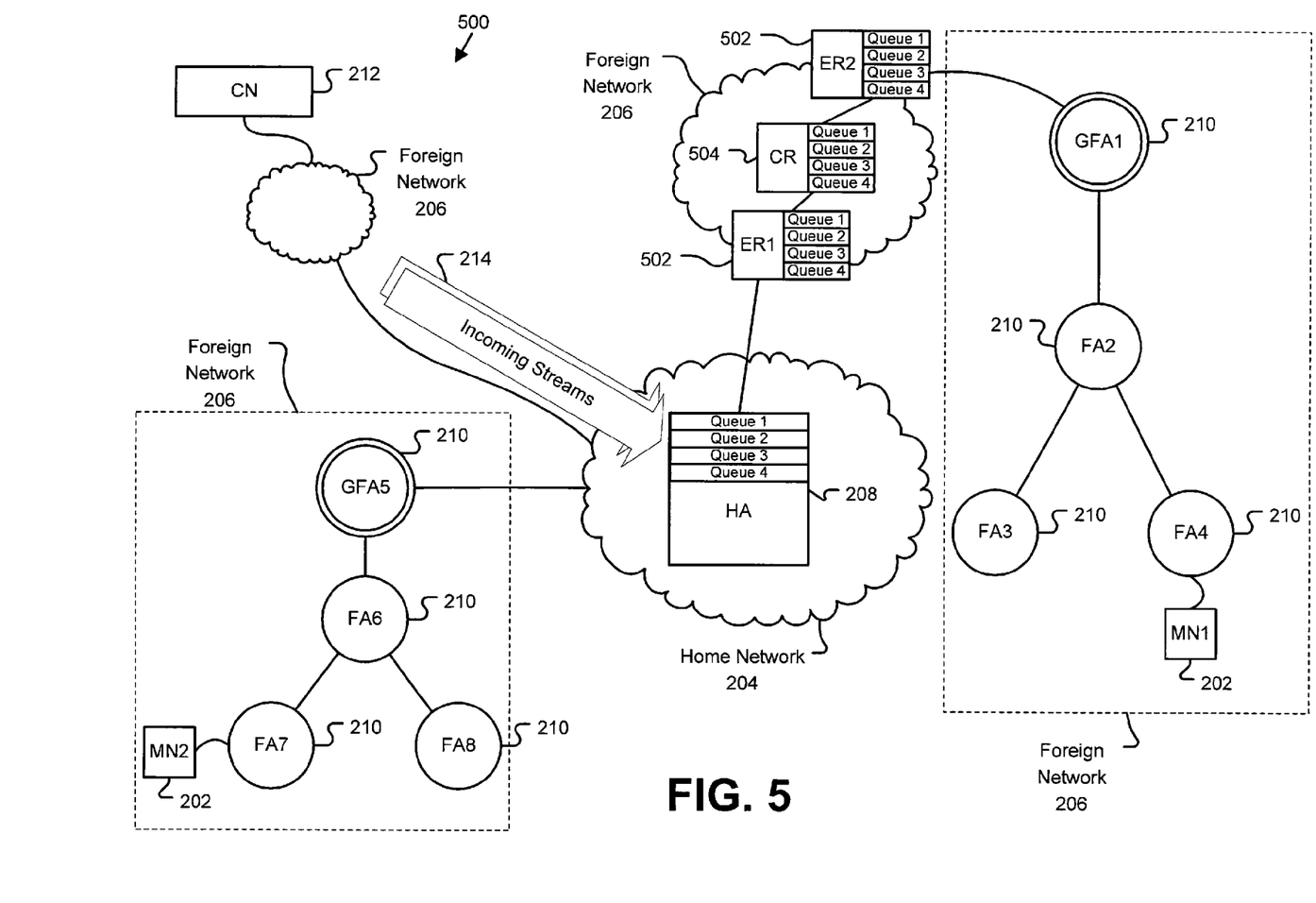
FIG. 5 illustrates an exemplary system for a stream classification approach to determining optimum stream performance.

FIG. 5 illustrates an example of using a stream classification approach to implement a performance test. A performance-controlled classification is a classification of traffic over a normal network path 402 that may be used by other traffic, where essentially no other network traffic is associated with the performance-controlled classification. The exemplary network of FIG. 5 includes elements discussed in detail above, and further includes exemplary edge router type device or other network device (ERs) 502 and core router type devices or other network devices (CR) 504 that include specific functionality to allow for handling of traffic of various stream classifications.

In the exemplary illustration, an ER 502 is a router that may be placed at the edge or periphery of a network. A CR 504, in contrast to an ER 502, is a router that may reside within the middle, or backbone, of a network rather than at its periphery. Although only two ERs 502 and only one CR 504 are illustrated, in many examples a network such as a foreign network 206 may include many ER 502 and CR 504 routers.

Generally, in systems that allow for traffic classification, each data packet may be placed into one of a limited number of traffic classes. Each router (e.g., ER 502, CR 504) on the network may be configured to differentiate traffic based on its class. Each traffic class may then be managed differently, and may be used to ensure preferential treatment for higher-priority traffic on the network. For example, traffic of a first class may be given precedence over traffic of a second class, indicating that in case of traffic congestion traffic of a second class is to be dropped first before traffic of the first class is dropped. In some examples, separate queues may be maintained for each different class of traffic.

The ERs 502 and CR 504 may include additional functionality to allow for the handling of traffic of different classifications. Specifically, after identifying an intended traffic component, the corresponding packets may be marked (sometimes referred to as being "colored") such that network elements may identify the marked traffic, and treat the marked traffic according to the associated priority, such as a one or more QoS parameters associated with the marked traffic. For example, traffic may be marked through the use of one or more various schemes, such as setting the IP Precedence bits or Differentiated Service Code Point (DSCP) fields in the IP headers of the packets of a communications stream. As another example, if MPLS is used, then the EXP bits may be set to a particular value to indicate a particular classification of the marked traffic.

The marked traffic may then be managed by devices of the communication network 110 such that the marked traffic may be treated according to the priority represented by the markings. Accordingly, frame and packet marking may be used to prioritize the network traffic. Further, queuing schemes, including but not limited to Weighted Random Early Discard (WRED) may be used to transmit the traffic according to the priorities indicated by the markings.

As an example, voice traffic may have particular requirements regarding the required bandwidth and delay QoS values for the traffic. To inform the network of these requirements, voice traffic with these particular requirements may be marked with a particular IP precedence value, for example, precedence value five. Intermediate network elements (such as routers) may receive the traffic, recognize the precedence value marking, and treat the packet accordingly.

In some examples, it is possible that an intermediate network element over which the traffic may be routed may map an indicated precedence value to a different precedence value for appropriate treatment within a different administrative domain. Mapping to a different technology marking, such as between IP precedence and MPLS EXP bits may allow for the accommodation of packet precedence over different technologies within interconnected networks of different types. For example, a precedence value of five over home network 204 may correspond to a precedence value of three for a foreign network 206. Accordingly, when traffic marked with a precedence value of five approaches a GFA 210 of the foreign network 206, the precedence value may be mapped to three by the GFA 210 of the foreign network 206.

This ability to handle traffic of different classifications may allow for a performance-controlled classification to be used by the OPTM 120 (e.g., as implemented by one or more of HA 208, HNGR 302, etc.) to create a test network path 404 for performing the controlled-performance test. In such an example, network elements may use traffic classifications rather that network links to prioritize traffic for differentiated treatment.

As shown in FIG. 5, a plurality of incoming streams 214 may be directed from CN 212, with one incoming stream 214 being directed towards MN1 202 and another incoming stream 214 being directed towards MN2 202. With reference to the identified communications stream 216 directed towards MN1 202, the HA 208 may create a test network path 404 for the stream 216 by marking the traffic directed towards MN1 202 with an IP precedence value indicating that the traffic is test network traffic. For the segment from HA 208 to GFA1 210, stream classification may be used to ensure appropriate treatment for the performance-controlled classification test traffic. Specifically, the test traffic marking may cause the corresponding controlled-performance test traffic to be queued in privilege queue four by ER1 502, CR 504, and ER2 502. However, for the network segment, GFA1 to FA2 to FA4, the illustrated available network elements do not support a classification queuing mechanism, so a dedicated link or the normal network path 402 from GFA1 to FA5 may be used for example. Accordingly, this scenario demonstrates a potential simultaneous use of both stream routing and stream classification schemes to set up a performance-controlled test for a single stream.

As another example, for the communications stream intended for MN2 202, appropriate queuing mechanisms may be supported by network elements GFA5, FA6 and FA7. Continuing with this example, because the HA 208 has, for example, identified that no significant network limitations exist with this path from GFA5 through to FA7, any class, or stream classification may be used for the performance-controlled test over this particular path.

Returning to the earlier example of the normal network path 402, and the corresponding test network path 404 over which stream traffic may be sent, it should be noted that the purpose of the performance test is to characterize the traffic of the stream 216 under test. Accordingly, the test network path 404 need not use the same network path 402 as the actual traffic. Further, the test network path 404 need not use the same type of network as the normal network path 402. By way of example, a test network path 404 may traverse a sub-network using a stream classification scheme to set up a performance-controlled test, when the normal network path 402 in contrast may be routed over a sub-network that does not even support stream classification.

It also should be noted that the RM 130 may not be aware of what quantity of network resources a communications stream 216 may attempt to use. Because some network applications may attempt to grab as much network bandwidth as possible, to prevent unacceptably large resource allocations to communications streams 216 associated with such applications, the RM 130 may impose a hard limit on the amount of resources that may be allowable, such as through imposing a hard limit on bandwidth or another resource being made provisioned over the test network path.

Which particular approach to use for creation of the test network path 404, or which combination of approaches to use, may further be determined by the RM 130 based on network topology information and congestion information, as well as based on the identified normal network path 402 being taken by the communications stream 216 under test. Accordingly, the performance-controlled path and a performance-controlled classification approaches may be used both individually and together, depending on network availability and need based on the particulars of the determined normal network path 402.

In systems that do maintain one or more dedicated test network paths 404, the overall cost of maintaining the dedicated test network paths 404 may be mitigated in several ways. For example, because the test network path 404 is only used by a stream 216 under test for a limited period of time, one dedicated test network path 404 may be used to provision test network paths 404 for many streams 216 under test, although potentially not simultaneously. Further, a dedicated test network path 404 need not be an entirely separate physical system, and may instead be implemented by an underlying network as a logical path, or as a particular QoS reserved substantially exclusively for the provisioning of text network paths 404 (e.g., associated with particular queues within the normal network path 402).

After identifying the test network path 404, the OPTM 120 logical component (e.g., as implemented by one or more of HA 208, HNGR 302, etc.) may perform the controlled-performance test. The performance test may be requested by the RM 130 based on a notification of identification of a new stream 216 by the HA 208, or the test may be requested to update the resource allocations for an identified stream 216, for example periodically based upon expiration of a timer (e.g., every 60 seconds).

The particulars of performing the performance test over the test network path 404 may involve two aspects. In a first aspect, the OPTM 120 may ensure that the performance-controlled path to the destination is created and is properly configured. In a second aspect, the OPTM 120 may direct the actual communication stream traffic to use the verified performance-controlled test path.

Considering the example as illustrated in FIG. 5, the first aspect in executing the performance test may be to ensure that the involved network elements are provisioned appropriately to associate the intended traffic with the appropriate queue. One or more network rules may be used to appropriately provision the network elements, and these rules may be provided to the requisite network elements through the network by HA 208. For example, a rule may state that if a source address of a packet is equal to that of HA 208, and if a destination address of the packet is equal to that of GFA1 210, and if the IP precedence of the packet is equal to four, then map the packet onto queue 4 of ER1 502, CR 504, and ER2 502. This rule may accordingly be sent to network elements ER1 502, CR 504, and ER 502. As another example, a rule may indicate for GFA1 210 to create a dedicated path having a source of GF1 210 and a destination of FA4 210, where the path is a direct path, and where the path does not set an additional bandwidth limitation. Thus rule may be sent to GF1 210 and FA4 210.

In the second aspect of the configuration activation, the OPTM 120 (e.g., as implemented by one or more of HA 208, HNGR 302, etc.) may instructs the controlled-performance network traffic to use an appropriate interface and queue that correspond to the controlled-performance network path selected for running the test. These instructions may be implemented as one or more logical rules that may be executed by a controlling network element. With regard to FIG. 4, this second aspect may be represented by a logical rules that stated that if a request to perform a controlled-performance test is received with a source address corresponding to CN 212 and a destination address corresponding to HA 208, and with a source port of Port X and a destination port of Port Y, then use queue 4 on an interface to ER1 502.

To perform the actual performance test, the OPTM 120 may divert the stream 216 under test from the normal network path 402 onto a test network path 404 on which substantially no other network traffic is traveling. The diversion of traffic onto the test network path 404 may be performed for a predetermined period of time. During the time the session is active, the traffic corresponding to the communications stream 216 may be redirected to use the controlled path substantially free of performance limitations on which performance is being measured. Accordingly, the test network path 404 may be used by the OPTM 120 to ensure that any test results obtained through use of the test network path 404 are not affected by network congestion or other network issues. It should be noted that artificial test traffic is not created; rather, the performance test is run based on the traffic of the communications stream 216 itself. Thus, through use of diverting traffic of the stream 216 under test, information retrieved by performing the controlled-performance test may represent the best possible performance than can be achieved by the stream 216.

For example, to implement the controlled-performance test, the HA 208 may adjust the local routing table such that the corresponding traffic is forwarded through the test network path 404 (e.g., 404-B1 and 404-B2 as illustrated in FIG.

4) rather than the normal network path 402 (e.g., 402-A1 and 402-A2 as illustrated in FIG. 4). Routing the traffic over the test network path 404 rather than the normal network path 402 thus allows the communications stream traffic to be measured in a performance-controlled environment, substantially without the influence of other network traffic (e.g., the other traffic on Path A). Once the test is complete, the HA 208 may again adjust the local routing table such that the corresponding traffic may be forwarded through the normal network path 402 (e.g., 402-A1 and 402-A2).

As another example, the HA 208 may adjust the classification of traffic to indicate that traffic is to be queued over performance-controlled classification. When the performance test is complete, the HA 208 may discontinue marking the traffic with the marking indicating that the traffic is to be queued over a performance-controlled classification.

While directing the stream 216 over the test network path 404, the OPTM 120 (e.g., as implemented by one or more of HA 208, HNGR 302, etc.) may monitor the communications stream for a period of time to capture performance metrics of the monitored communications stream and thus characterize the stream. Exemplary performance metrics may include maximum bandwidth and average bandwidth, among others. In addition, other information that may be helpful in the context of resource management may also be captured, such as a burstiness pattern of the communications stream. The performance test may take place for a configurable period of time, and upon expiration of the time period, traffic may be rerouted through the normal network path 402, and test results may be forwarded to the RM 130.

When the RM 130 receives the performance test results from the OPTM 120, the RM 130 may then identify the requested resources that allow the communications stream to achieve its potential best performance. By way of example, the OPTM 120 (e.g., as implemented by one or more of HA 208, HNGR 302, etc.) may receive maximum bit rate, average bit rate, and maximum burst length of the communications stream 216.

The information and other information known to the RM 130 may allow the RM 130 to determine whether sufficient network resources exist to allow for the communications stream 216 to be provisioned over the communications network 110. For example, RM 130 may use knowledge of the current state of the communications network 110, such as which link capacities for communications links as well as the capacity utilization of the communications links to accommodate a request for resources. The RM 130 may further consider QoS class information associated with the identified stream 216 based on the determined client owner of the stream 216. Based on the aforementioned sources of information, the RM 130 may determine whether or not sufficient resources are available to allow the stream 216 to be provisioned over the normal network path 402 while considering network topology of the communications network 110, current bandwidth utilization of the communications network 110, and QoS class for the identified stream 216.

For example, the RM 130 may determine that sufficient network resources exist to provision the stream 216 over the normal network path 402. In such an example, the stream 216 may thus be provisioned over the normal network path 402 according to the characterized resources determined for the stream 216. Optionally, if the communications stream 216 is accepted by the RM 130, the OPTM 120 may set a timer to schedule a further performance test for the communications stream 216, such that more current characteristics of the communications stream may be captured. A further performance test may therefore be executed to update the resource allocations for the stream 216.

To further accommodate the request for resources for streams 216 for which the network 110 has insufficient resources, the RM 130 may optionally consider intervention actions including but not limited to network reconfiguration, dropping of other communications streams 216 such as those of lower priority traffic (e.g., based on an IP precedence value with which the packets are marked), lowering the resource allocations of other communication stream 216 to provision adequate bandwidth for the resourced resources, and provisioning fewer resources than preferred for stream 216.

If the communications stream 216 may be accommodated by the communications network 110, with or without intervention, then the CN 212 and/or the MN 202 may be notified, and the communications stream 216 may be directed over the normal network path 402 identified by the RM 130 or HA 208. On the other hand, if the communications stream 216 is unable to be accommodated over the communications network 110, then a rejection indication may be generated by the RM 130 and sent to the CN 212 and/or the MN 202 to indicate that the connection cannot be accommodated.

Figure 6:
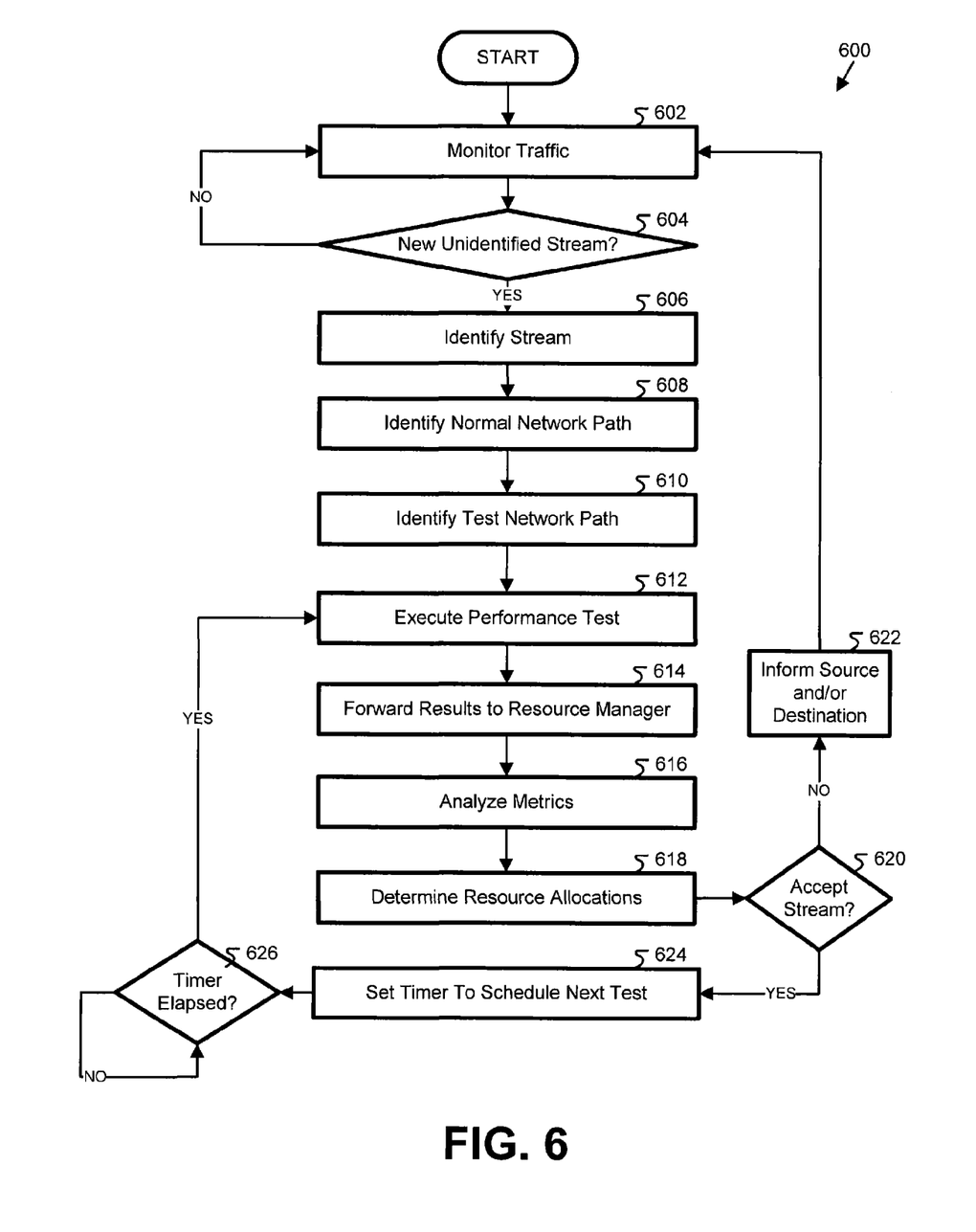
FIG. 6 illustrates an exemplary process flow for detecting a stream and determining optimum stream performance.

FIG. 6 illustrates an exemplary process flow for detecting a stream and determining optimum stream performance.

In step 602, network traffic is monitored. For example, the HA 208 may be located at a gateway point of a home network 204, and may monitor traffic components including a plurality of different incoming communications streams 214 that may pass through, such as traffic directed from a CN 212. Based on the details of the traffic of the communications streams 214, the HA 208 may identify and track the various streams 214.

Next, in step 604, it is determined whether a new unidentified communications stream 214 is identified. For example, the HA 208 may use one or more of source IP address, destination IP address, source port and destination port values (or any other fields located in the IP and transport layer headers of the incoming traffic) of the monitored traffic for tracking purposes and to identify particular incoming communications streams 214 on the network. A table or other structure of identified streams 216 may be maintained by the HA 208 or a data store in selective communication with the HA 208. This table or structure may store characteristic information relating to the stream (e.g., source IP address, destination IP address, source port and destination port values, etc.) and may be used to determine whether an incoming communications stream 214 corresponds to an identified stream 216 or to an unknown incoming stream 214. If a new unidentified communications stream 214 is identified, step 606 is executed next. Otherwise, step 602 is executed next.

Next, in step 606, the unidentified stream is identified. For example, the HA 208 may associate the incoming communications stream 214 with a client owner of the stream, and may associate the stream with an appropriate corresponding QoS class based on the determined QoS privileges of the client owner through use of a privileges database 304. The HA 208 may add additionally add a record relating to the stream 216 into the table or structure of characteristic information for identified streams 216.

Next, in step 608, a normal network path 402 for the identified stream 216 is identified. For example, HA 208 may access a routing table of the communications network 110, including information about which network devices are connected to which other network devices, and information relating to the paths between the network devices. Using the routing table information, the HA 208 may determine a least-cost path from itself to any other node in the communications network 110, such as using a shortest path algorithm.

Next, in step 610, a test configuration for the identified stream 216 is identified. For example, HA 208 may identify an appropriate test network path 404 to carry the stream traffic, such that the controlled path is substantially free of performance limitations on which performance is being measured.

Next, in step 612, a performance test over the identified test network path 404 is executed. For example OPTM 120 may direct HA 208 to perform a performance test based on a notification of identification of a new stream 216 by the HA 208. As another example, OPTM 120 may direct HA 208 to perform a performance test to update the resource allocations for an identified stream 216 based upon expiration of a timer.

Next, in step 614, the performance test results are forwarded to a RM 130. For example, the test results may be forwarded from HA 208 to the RM 130.

Next, in step 616, the metrics are analyzed by the RM 130. For example, the HA 208 may identify maximum bit rate, average bit rate, and maximum burst length of the communications stream 216. Such information may allow the RM 130 to determine an appropriate amount of resources over the normal network path 402 for the communications stream 216.

Next, in step 618, resource allocations are determined by the RM 130. For example, the RM 130 may determine whether or not sufficient resources are available to allow the stream 216 to be provisioned over the normal network path 402 based on network topology of the communications network 110, current bandwidth utilization of the communications network 110, and QoS class for the identified stream 216.

Next, in step 620, the RM 130 determines whether to accept or reject the communications stream 216. For example, the RM 130 may determine that sufficient resources are available to allow the stream 216 to be provisioned over the normal network path 402. In such an example, the stream 216 may be provisioned over the normal network path 402 according to the characterized resources determined for the stream 216. However, the RM 130 may determine that sufficient resources are not available over the normal network path 402, even optionally taking into account intervention actions. If the stream is determined to be accepted, step 622 is executed next. Otherwise, step 624 is executed next.

In step 622, the source and/or the destination of the communications stream 216 is informed that the communication stream 216 is rejected. For example, the CN 212 from which the stream 216 is directed may be informed that the stream 216 was rejected. Next, step 602 is executed.

In step 624, a timer is set to schedule a future performance test for the communications stream 216. For example, a timer may be set to perform a second performance test in 60 seconds. Next, in step 626, it is determined whether the timer has elapsed. If no, then step 626 is executed next. Otherwise, step 612 is executed next.

In general, computing systems and/or devices, such as OPTM 120, RM 130, HA 208, FA 210, CN 212, and HNGR 302 may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as privilege database 304 described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.).

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
    a communications network configured to support transmission of a plurality of communications streams;
    a resource manager communicatively coupled to said communications network and configured to provision resources of said communications network to said plurality of communications streams; and
    a performance test manager communicatively coupled to said communications network and configured to:
        identify a communication stream from said plurality of communications streams;
        identify a test network path for said identified communication stream and including a performance-controlled path that is free of other network traffic; and
        divert said identified communication stream to said test network path for a configurable time period to perform a performance test over said test network path.

2. The system of claim 1, wherein said performance test manager is further configured to send results of said performance test to said resource manager and said resource manager is further configured to receive said results and provision resources to said communication stream based at least in part on said results.

3. The system of claim 2, wherein said resource manager is further configured to provision resources for said communications stream further based on at least one of network topology of said communications network, current bandwidth utilization of said communications network, and a privilege associated with said communications stream.

4. The system of claim 1, wherein said resource manager is further configured to:
    analyze results of said performance test to determine a resource allocation for the communications stream;
    determine whether available network bandwidth on said communications network is sufficient to provision the communications stream over a normal network path; and
    reroute said identified communication stream to the normal network path after said performance test.

5. The system of claim 4 wherein said resource manager is further configured to selectively accept said communications stream based on said determination.

6. The system of claim 1, further comprising a corresponding node communicatively coupled to said communications network and configured to identify the communication stream and send said communications stream over said communications network to a mobile node.

7. The system of claim 1, wherein said communications stream includes internet protocol traffic, and wherein said performance test manager is configured to identify said communications stream using at least one field located in the internet protocol and transport layer headers of the internet protocol traffic.

8. The system of claim 7, wherein said performance test manager uses at least one of source internet protocol address, destination internet protocol address, source port, and destination port fields of said headers to identify said communications stream.

9. The system of claim 1, wherein said performance test manager is further configured to:
    associate said communications stream with a mobile node of a client owner of said communications stream;
    determine quality of service privileges associated with said client owner; and
    associate said communications stream with a corresponding quality of service class based on said determined quality of service privileges of said client owner.

10. The system of claim 9, wherein said client owner is determined based on at least one of on the source internet protocol address and destination internet protocol address of the communications stream.

11. The system of claim 1, wherein said resource manager is further configured to:
    set a timer to schedule a second performance test for said communications stream;
    determine whether said timer has elapsed; and
    execute said second performance test for said communications stream.

12. The system of claim 1, wherein said performance test manager is implemented in part by at least one of a home agent and a home network gateway router type device.

13. A method, comprising:
    monitoring network traffic over a communications network by a performance test manager;
    identifying by the performance test manager a new communications stream directed from a corresponding node;
    identifying a test network path for the identified communications stream and including a performance-controlled path;
    divert said identified communication stream to said test network path for a configurable time period to execute a performance test for the communications stream over the test network path; and
    determining a resource allocation for the communications stream based on the performance test.

14. The method of claim 13, further comprising:
    identifying a normal network path for the communications stream, and
    determining the test network path based on the normal network path.

15. The method of claim 13, further comprising;
determining whether available network bandwidth on the communications network is sufficient to provision the communications stream over a normal network path; and rerouting the identified communication stream to the normal network path after the performance test.

16. The method of claim 15, further comprising selectively accepting the communications stream based on the determination.

17. A non-transitory computer-readable medium embodying computer-executable instructions comprising:

monitoring network traffic over a communications network by a performance test manager;

identifying by the performance test manager a new communications stream in the network traffic directed from a corresponding node;

identifying a test network path for the identified communication stream and including a performance-controlled path;

divert the identified communication stream to the test network path for a configurable time period to execute a performance test for the communications stream over the test network path; and determining a resource allocation for the communications stream based on the performance test.

18. The computer-readable medium of claim 17, further comprising:

identifying a normal network path for the communications stream;

determining the test network path based on said normal network path.

19. The computer-readable medium of claim 17, further comprising:

determining whether available network bandwidth on the communications network is sufficient to provision the communications stream over a normal network path; and rerouting the identified communication stream to the normal network path after the performance test.

20. The computer-readable medium of claim 19, further comprising selectively accepting the communications stream based on the determination.

* * * * *